Figures 1, 7:
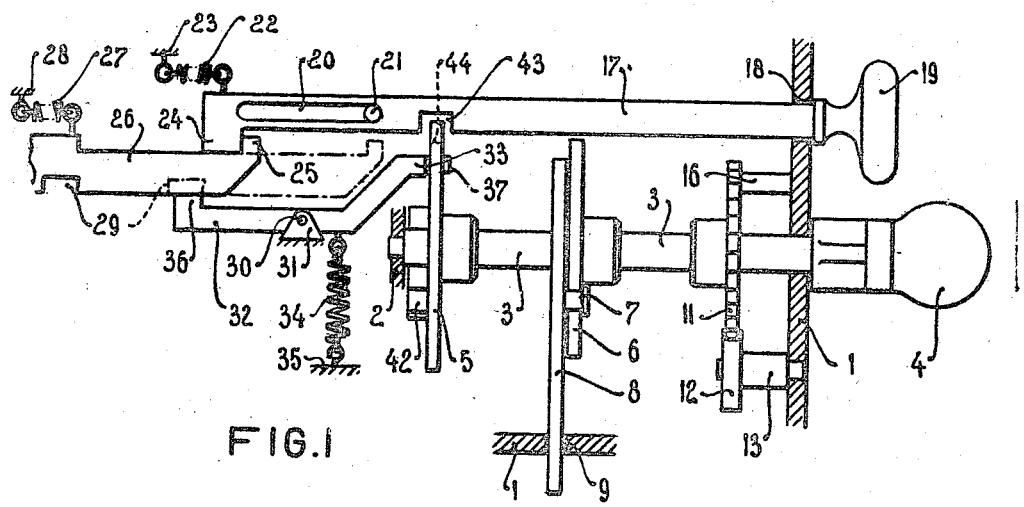

Feb. 23, 1943. J. LODER 2,311,905
CONTROL MECHANISM FOR MOTOR DRIVEN FLUID MEASURING APPARATUS
Filed Jan. 18, 1940    4 Sheets-Sheet 1

Inventor,
J. Loder

By: Glascock Drawings Seebold

Feb. 23, 1943. J. LODER 2,311,905
CONTROL MECHANISM FOR MOTOR DRIVEN FLUID MEASURING APPARATUS
Filed Jan. 18, 1940 4 Sheets-Sheet 2

Inventor,
J. Loder.
By: Glascock Downing Seebold

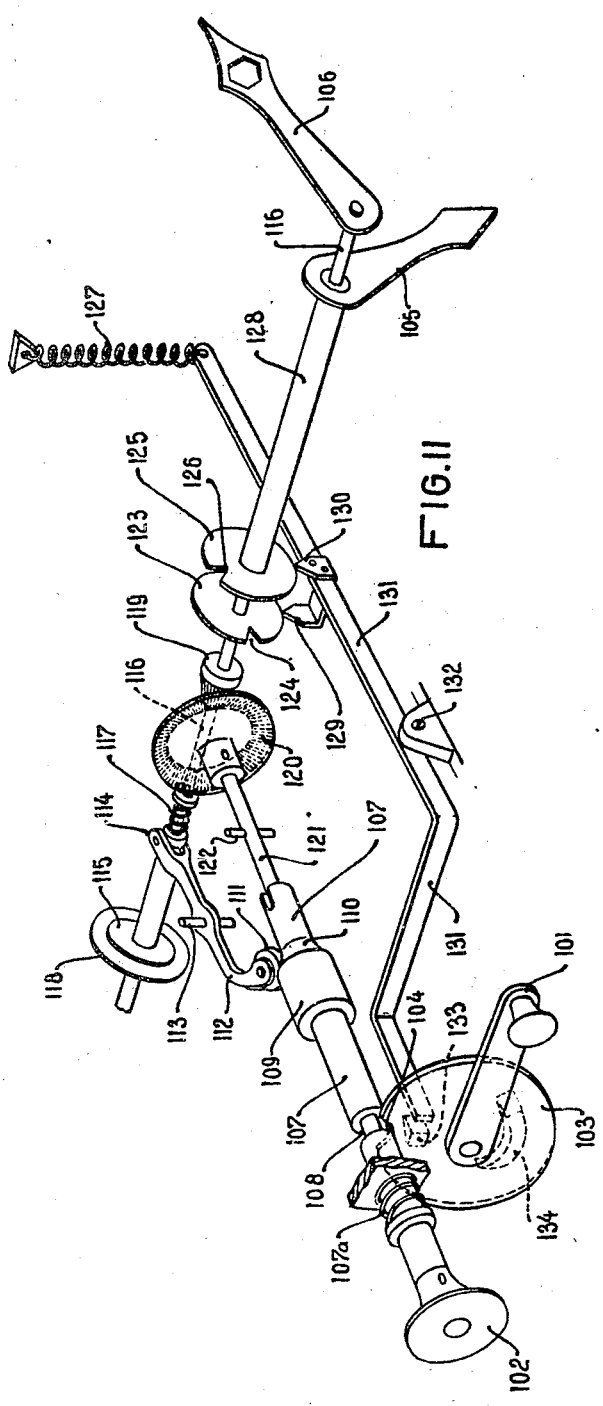

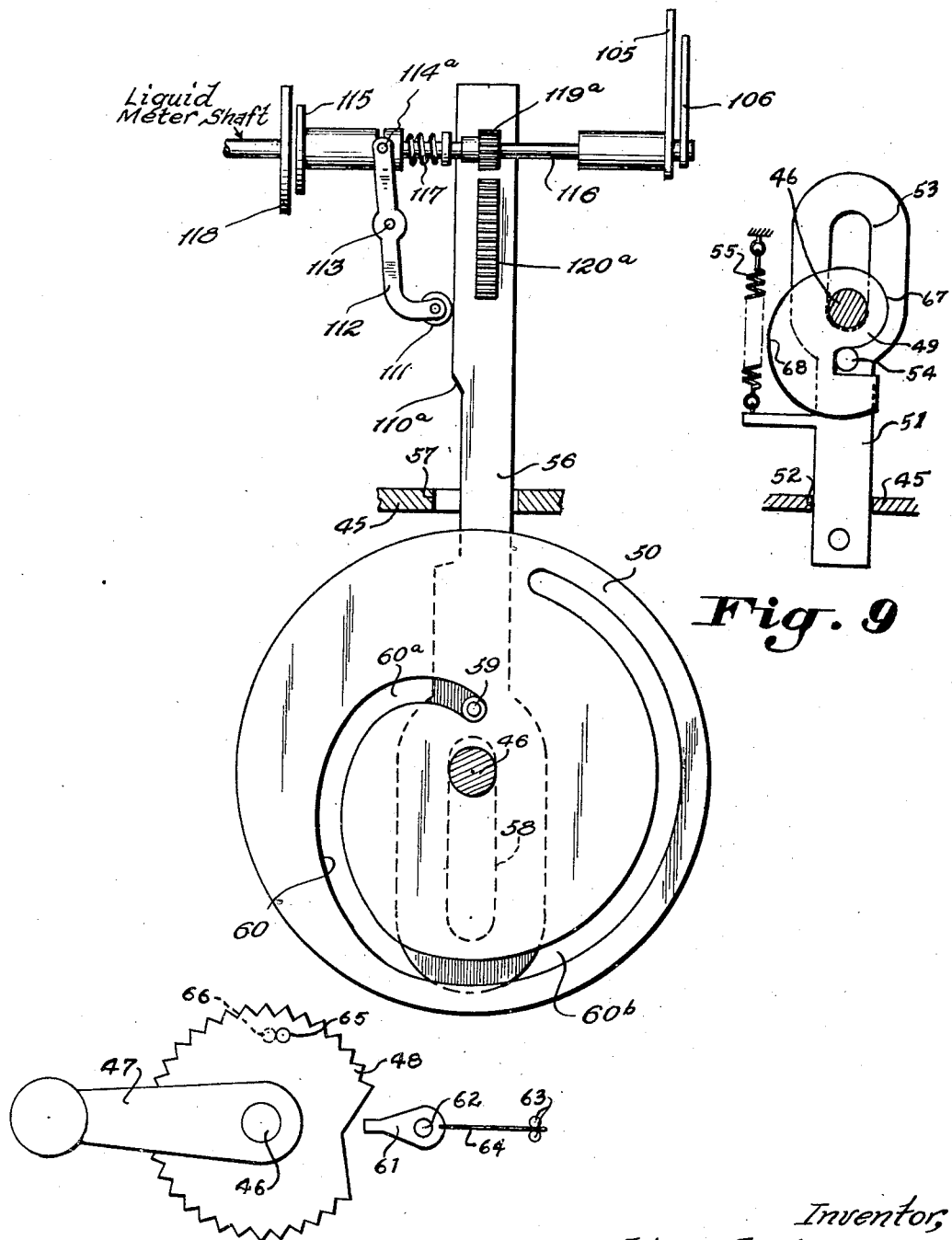

Patented Feb. 23, 1943

2,311,905

UNITED STATES PATENT OFFICE 2,311,905

CONTROL MECHANISM FOR MOTOR DRIVEN FLUID MEASURING APPARATUS

Johan Loder, Wassenaar, Netherlands; vested in the Alien Property Custodian

Application January 18, 1940, Serial No. 314,551
In the Netherlands January 17, 1939

3 Claims. (Cl. 221—101)

This invention relates to means for putting into and out of operation, and for resetting to zero, motor driven computing mechanism, more especially in liquid dispensing apparatus such as a gasoline filling-station pump.

In apparatus of the kind referred to, it is ordinary practice for the liquid that is to be dispensed, to be forced, by a motor driven pump, through a meter provided with computing mechanism, for instance a counter, whereby the quantity of liquid delivered by the meter is designated.

Ordinarily, the apparatus is fitted with handles by means of which, after the dispensing of a desired quantity of liquid, the motor is stopped, and the counter first disengaged from the meter and thereafter reset to zero. When a fresh designated quantity of liquid is to be dispensed, it is necessary, by means of said handles, first to reestablish the operative association of the counter with the meter, and thereafter to switch in the motor.

Known apparatus of this kind permit mistakes to be made and fraud to be practised by the man in charge. For instance, after the dispensing of a designated quantity to one purchaser, the motor can be switched in, with a view to dispensing a fresh quantity to a second purchaser, without the counter having been reset to zero. In that case, after the dispensing of the fresh quantity, the counter will designate the sum of both quantities and the second purchaser may be overcharged.

My present invention has for its object to obviate the possibility of such mistakes being made. With this object in view, the invention consists in the provision, in combination with the elements for operatively associating the counter with and disengaging it from the meter and for resetting it to zero, and for putting the motor in and out, of interlocking means preventing the motor, after being switched out, from being again started unless the counter has first been disengaged from the meter, reset to zero and reassociated with the meter.

If the apparatus is fitted with two separate handles, the one for switching the motor in and out, the other for putting the counter into and out of operation and for resetting it to zero, the invention provides for locking means preventing the first handle from being moved to its "in" position until said means have been removed from locking position by movement of the second handle with a view to resetting the counter.

The invention allows the apparatus to be provided with only one single handle operatively coupled, through suitable mechanism, both with the element for putting the counter into and out of operation and for resetting it, and with the element for switching the motor in and out, in such a manner that said handle is prevented from performing its motor switching in movement until having been moved to reset the counter.

In order that my invention may be more fully understood, I shall now proceed to describe the same with reference to the annexed more or less diagrammatic drawings, which illustrate mechanism for putting in and out, and for resetting to zero, computing mechanism adapted to be driven by a motor.

Figure 2:
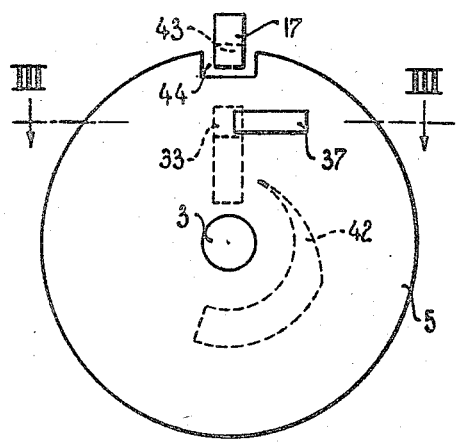
Figure 3:
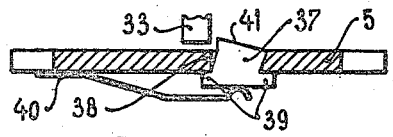

On said drawings:

Fig. 1 is a longitudinal sectional elevation of one embodiment of the invention, Fig. 2 is an elevation of a detail of said embodiment, Fig. 3 is a section along the line III—III in Fig. 2, Figs. 4, 5 and 6 are front elevations of other details of the mechanism shown in Fig. 1, Fig. 7 is a longitudinal sectional elevation of a second embodiment, of which Figs. 8, 9 and 10 show various details in elevation, Fig. 11 is a perspective view of a third embodiment.

The mechanism according to Figs. 1 to 6 inclusive comprises a casing 1, of which only some detached parts of the walls have been shown. Rotatably supported by one of said walls and by a partition 2 of the casing is a shaft 3 provided with a crank handle 4 outside the casing and, adjacent to said partition, with a circular locking disk 5, see Figs. 1 and 2.

Shaft 3 also carries a cam 6 (Figs. 1 and 4) cooperating with an antifriction roller 7. Said roller is mounted on a rod 8, which projects outwardly through an aperture 9 of casing 1 and is adapted for lengthwise vertical movement under the control of said cam. A spring 10, whose one end is secured to a fixed part of the casing and whose other end is connected to the switch rod 8, holds the roller 7 in engagement with the cam face. The upper, bifurcated end of rod 8 engages the shaft 3, thus guiding said rod in its rectilinear vertical movement.

Figure 4:
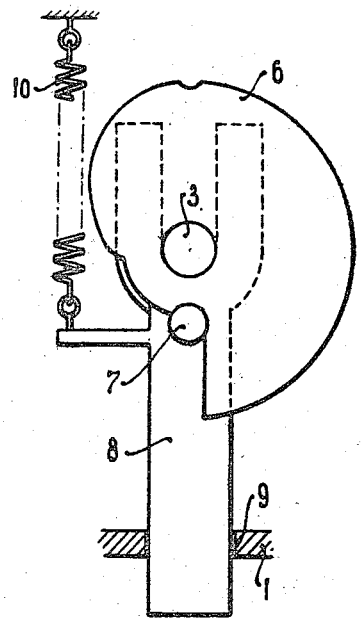

Rod 8 is the element provided for switching in and out the electromotor of a pump for forcing liquid, for instance gasoline, to be dispensed in designated quantities to purchasers at a filling station, through a liquid meter, it being understood that, when rod 8 assumes its upper position as shown in Figs. 1 and 4, the motor is switched out. Since the motor, the pump and the liquid meter may be of any conventional type, they have not been illustrated.

Keyed to the shaft 3 is a ratchet segment 11 (Figs. 1 and 5) cooperating with a pawl 12 pivoted as at 13. Said pawl is loaded by two oppositely acting springs 14 secured as at 15 to fixed parts of the casing 1 and tending to hold the pawl 12 in its central position. A fixed abutment 16 limits the extent of rotary motion of the ratchet segment 11 in the one and in the other direction.

Mounted within the casing is a horizontal rod 17 (Fig. 1), the right hand side end of which projects outwardly through an aperture 18 in the wall of the casing 1 and is provided with a knob 19. The inner end of rod 17 has a longitudinal slot 20 engaged by a fixed guiding pin 21, and is loaded by a spring 22 secured to a fixed part 23 of the casing. Thus, rod 17 can be manually pulled outwards through a distance determined by the length of slot 20, and, when released, be retracted by spring 22.

The inner end of rod 17 has a projection 24 cooperating with a projection 25 of a horizontal rod 26, which is the element whereby computing mechanism such as a counter (not shown) can be associated with and released from the liquid meter, and be reset to zero. A spring 27, which is secured to a fixed part 28 of casing 1, tends to hold projection 25 in engagement with projection 24. Rod 26 has freedom of longitudinal sliding movement between the terminal position shown in full lines and the terminal position shown in dotted lines.

When rod 26 has moved to the left, it operatively couples the counter with the liquid meter. Its movement to the right releases said coupling and resets the counter to zero. The means associated with rod 26 for performing these functions may be of the conventional type as shown in Fig. 10.

Rod 26 has a recess 29. Pivoted as at 30 to a fixed bracket 31 is a double-armed lever 32, 33. Arm 33 is engaged by a spring 34, which is secured as at 35 to the casing and tends to swing the lever 32, 33 in a clockwise direction, so as to hold a projection 36 of arm 32 in engagement with resetting rod 26. If projection 36 engages the unbroken portion of the bottom face of rod 26, as shown in Fig. 1, the free end of lever arm 33 is located in the path of a ratchet 37 carried by locking disk 5 (Figs. 1, 2 and 3).

Ratchet 37 consists of a small plate, which is loosely mounted in a slot 38 of disk 5 and normally projects with an inclined face 41 from the left hand side face of disk 5 as seen in Fig. 1. It is provided with shoulders 39, which normally engage the opposite disk face under the thrust of a spring blade 40.

If resetting rod 26 has moved to its right hand side end position (Fig. 1) in a manner to be described, projection 36 of rocking lever 32, 33 enters the recess 29 of rod 26 under the action of spring 34. With a view to returning the rocking lever 32, 33 into its original position, disk 5 is provided with a cam 42, the operation of which will also be described hereinafter.

Rod 17 has a recess 43, into which the unbroken circumferential portion of disk 5 projects if rod 17 assumes its left hand side end position. In its turn, disk 5 has a recess 44 for receiving rod 17 when said recess is in top position.

The mechanism so far described operates as follows.

The full lines in Fig. 1 illustrates the positions of the various parts immediately after the quantity of liquid desired by a purchaser has been dispensed. The electromotor for driving the pump has just been switched out, and the counter, still operatively associated with the liquid meter, has not yet been reset to zero. Consequently, the amount dispensed is still exhibited.

If now another quantity of liquid is to be dispensed, the counter should first be reset to zero. To this end, rod 17 (Fig. 1) is gripped by the hand and pulled to the right in Fig. 1. During this outward movement of rod 17, projection 25 is engaged by projection 24 so that rod 26 is compelled to follow said movement. As a consequence, rod 26 is moved to its right hand side end position shown in dotted lines in Fig. 1, thereby disengaging the counter from the liquid meter and resetting it to zero.

When rod 26 reaches said end position, projection 36 of rocking lever 32, 33 snaps into recess 29, so that rocking lever 32, 33 is swung through a small angular distance in clockwise direction and the end of lever arm 33 is moved out of the path of ratchet 37. If knob 19 is then released, rod 17 returns to its left hand side end position under the pull of spring 22, but rod 26 is prevented from following this movement, since it is locked by projection 36.

Obviously, the counter should again be operatively coupled with the meter, before the pump motor is again switched in for dispensing a fresh quantity of liquid.

Figure 5:
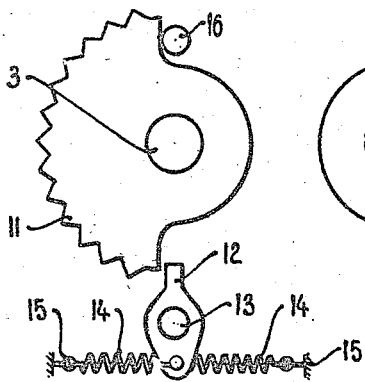
Figure 6:
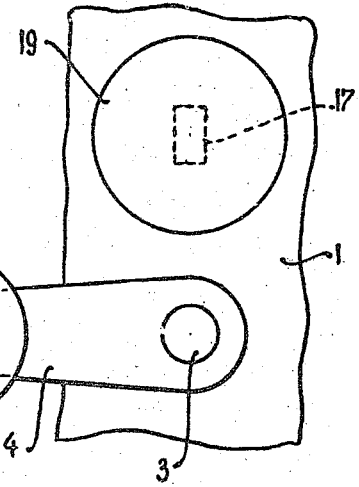

As stated before, shaft 3, which was previously locked by the cooperation of rocking lever arm 33 with ratchet 37, has already been released by the restricted angular movement in clockwise direction of said lever. Consequently, shaft 3 with the parts secured thereto can now be rotated by means of the handle 4, see Figs. 1 and 6. This rotation can only take place in counterclockwise direction as seen in Fig. 6, and through an angular distance of 180°, owing to the presence of the abutment 16 (Fig. 5). During the first part of this rotation, cam 42 of disk 5 (Fig. 2) raises the end of lever arm 33 against the pull of spring 34, and returns it to its upper position (Fig. 1), thereby rocking lever 32, 33 in counterclockwise direction and retracting projection 36 from recess 29. Rod 26 is thus released and returns to its left hand side end position (Fig. 1) under the action of spring 27, thereby restoring the operative association of the counter with the liquid meter.

Rotation of shaft 3 by means of handle 4 also has the effect of moving rod 8 down owing to the cooperation of cam 6 (Fig. 4) with antifriction roller 7, so that the pump motor is switched in and the pump started, after the counter has been coupled to the meter.

The pump forces liquid through the meter, and the amount of liquid passing the meter is recorded by the counter. As soon as the received quantity of liquid has been dispensed as designated by the counter, the motor is switched out by rotation of the crank handle 4 in a clockwise direction. During this return motion of the handle 4, the ratchet segment 11 (Fig. 5), the cam 6 (Fig. 4) and the locking disk 5 (Fig. 2) are returned to their initial positions. The return movement of crank 4 is again limited by abutment of ratchet segment 11 against pin 16 (Fig. 5). Owing to the return movement of cam 6 (Fig. 4), rod 8 is again raised by the spring 10, whereby the pump motor is switched out and no further liquid is supplied to the meter.

When locking disk 5 (Fig. 2) returns to its initial position, the inclined face 41 of ratchet 37 (Fig. 3) moves over the rocking lever arm 33, so that the ratchet is forced inward against the thrust of spring 40. As soon as ratchet 37 has reached its initial position, it is again thrown out by said spring so as to lock disk 5 against rotation in counterclockwise direction, until rod 17 is again pulled outward to reset the counter to zero, whereby, as explained hereinbefore, projection 36 of rocking lever 32, 33 snaps into recess 29 and lever arm 33 is moved out of the path of ratchet 37.

Should the crank handle 4 in its movement for stopping the motor, be turned through an angle insufficient to allow the ratchet 37 (Fig. 3) to be thrown out by spring 40 after having moved past lever arm 33, the motor could again be switched in without the counter having been reset to zero. In this manner, and assuming a fresh amount of liquid to be so dispensed, the amount of liquid previously dispensed, or part of said quantity, could be charged to the purchaser of the fresh quantity. This, however, is prevented by the ratchet mechanism shown in Fig. 5. By virtue of the cooperation of pawl 12 with the ratchet teeth of segment 11, the crank handle 4, when turned in the one or in the other direction, is locked against reverse motion until it has been turned to the full extent. Only thereafter pawl 12 moves out of mesh with the ratchet segment 11 so as to allow this segment, and consequently the crank handle 4, to be moved in reverse direction.

Recesses 43 and 44 (Figs. 1 and 2) have been provided with a view to preventing the counter from being reset to zero while the motor is running. When crank handle 4 is turned, starting from the position of rest as shown in Fig. 6, the unbroken circumferential edge portion of locking disk 5 projects into recess 43 of rod 17, so as to lock said rod against outward movement. If, however, the motor is switched out, recess 44 of disk 5 is in registry with recess 43 of rod 17, so that the latter has freedom of lengthwise outward movement.

As already stated before, it is impossible for a fresh quantity of liquid to be dispensed, as long as the counter has not yet been reset to zero, since ratchet 37 (Figs. 1-3) prevents premature rotation of crank handle 4.

The embodiment shown in Figs. 7-10 comprises only on single handle both for switching the pump motor in and out, and for resetting the counter to zero.

Journaled in bearings of a casing 45 (Fig. 7) is a shaft 46. The right hand side end of said shaft projects from the casing, and secured to said end is a crank handle 47. Keyed to that portion of shaft 46 which extends within the casing are a ratchet disk 48 (Fig. 8), a cam 49 (Fig. 9), and a cam groove disk 50 (Fig. 10).

Cam 49 (Fig. 9) controls the movement of rod 51 for switching in and out the pump motor. Said rod projects through an aperture 52 of casing 45. Its inner end is provided with an elongated slot 53, through which shaft 46 is passed so as to rectilinearly guide the rod. Rod 51 carries an antifriction roller 54 and is loaded by a spring 55, which is secured to a fixed portion of the casing and urges said roller into permanent engagement with the circumference of cam 49.

Cam groove disk 50 (Fig. 10) governs the movement of a rod 56, which serves for coupling and uncoupling the counter and for resetting the same to zero. Rod 56 projects vertically upwards through an aperture 57 of the casing 45 and engages shaft 46 through an elongated slot 58 so as to be rectilinearly guided. Pivoted to resetting rod 56 is an antifriction roller 59 engaging a cam groove 60 of disk 50.

The rod 56 carries a rack gear 120a adapted to mesh with a pinion 119a. The pinion 119a is mounted on a shaft 116 of the counter so as to rotate the shaft 116 during downward movement only of the rod 56 and during upward movement of the rod 56 the pinion 119a is rotated freely by the rack gear 120a without driving the shaft 116. The counter represented by the hands 105 and 106 is driven by a liquid meter when the clutch parts 115 and 118 engage each other. The clutch part 115 is biased by a spring 117 so as to normally engage the disc 118. A lever 112 is pivotally mounted at 113 for uncoupling the counter from the liquid meter. The lever 112 is provided with a roller 111 which is maintained in engagement with the rod 56 by the spring 117. The upper end of the lever 112 is provided with pins 114a extending into an annular groove in the hub of the disc 115. The rod 56 is provided with a cam 110a for swinging the lever 112 so as to uncouple the clutch.

Disk 48 (Fig. 8) cooperates with a pawl 61, which is pivoted as at 62 and is secured to a spring blade 64 slidably mounted between two fixed pins 63, in such a manner that spring 64 always tends to hold pawl 61 in a neutral position. In Fig. 7 pawl 61 is not visible. Disk 48 is toothed through the greater part of its circumference and carries a laterally projecting pin 65 adapted, on rotation of said disk in either direction, to abut against a fixed stop 66, the angular distance between the two end positions being 340°. The function of the ratchet mechanism shown in Fig. 8 is not principally different from that of the ratchet gear illustrated in Fig. 5.

The device so far described with reference to Figs. 7-10 operates as follows, it being understood that, with the parts in the positions shown, the pump motor is switched out and the counter, after being operatively disengaged from the liquid meter, reset to zero.

If a certain quantity of liquid is to be dispensed, it is necessary first to restore operative engagement between the counter and the liquid meter, and thereafter to switch in the pump motor. To accomplish this, the crank handle 47 and the parts connected thereto, namely the shaft 46, the ratchet disk 48 (Fig. 8), the cam 49 (Fig. 9) and the cam groove disk 50 (Fig. 10) are turned in clockwise direction.

On rotation in said direction of crank handle 47 through an angle of 170°, the first part 60a of cam groove 60 cooperates with roller 59 to raise the resetting rod 56 through a distance as to restore the operative engagement of the counter with the liquid meter. During said part of the rotation, cam 49 (Fig. 9) does not impart any movement to switch rod 51, since the corresponding portion 67 of said cam is concentric with shaft 46.

Further rotation of crank handle 47 through another 170° causes pin 65 to abut against the left hand side of stop 66, and during this part of the rotation antifriction roller 59 (Fig. 10) moves through portion 60b of cam groove 60, which portion is concentric with shaft 46, so that resetting rod 56 remains stationary, but the corresponding portion 68 of cam 49 cooperates with antifriction roller 54 so as to force switch rod 51 downward against the tension of spring 55. Consequently, the pump motor is switched in and liquid can be dispensed, the quantity thereof being exhibited by the counter.

When the desired quantity of liquid has been dispensed, crank handle 47 is turned in counterclockwise direction, until pin 65 abuts against the right hand side of stop 66. During the first 170° of this reverse movement, switch rod 51 (Fig. 9) is permitted to be raised by spring 55, so that the pump motor is switched out, but no movement is imparted to resetting rod 56 (Fig. 10), which thus remains in the upper position.

Rotation of crank handle 47 through another angular distance of 170° causes resetting rod 56 (Fig. 10) to be moved downward, while switch rod 51 (Fig. 9) remains stationary in its upper position. Said downward movement of resetting rod 56 disengages the counter from the liquid meter when the roller 111 engages the cam 110a. The downward movement of the rod 56 also resets the counter to zero by means of the rack gear 120a and the pinion driving the shaft 116.

The ratchet gear 48, 61, which is known per se, prevents the pump motor from being again switched in prior to the counter being reset to zero, since it compels the operator to turn the crank handle 47 through the full angular distance of 340° in the one or the other direction before allowing him to move it in the reverse direction.

In the embodiment shown in Fig. 11, the numeral 101 designates a crank handle, and 102 is a knob, both provided outside a casing (not shown) enclosing the mechanism to be described hereinafter. Crank handle 101, which serves for switching in the pump motor by means not illustrated but similar to those described with reference to Fig. 4 of the drawings, is secured to a disk 103 having a notch 104. Knob 102, by means of which the pointers 105 and 106 of the counter can be reset to zero as will be explained in further detail hereinafter, is secured to one end of a rod 107, which is loaded by a spring 107a tending to urge it outward, or to the left, and is provided with a circumferential groove 108. The inner end of rod 107 is hollow and bifurcated. In the position shown, groove 108 is located in the plane of disk 103, so that rod 107 does not prevent said disk from rotation, and disk 103 does not prevent rod 107 from lengthwise movement, since its notch 104 lies in the path of said rod. However, rotation of disk 103 has the effect of locking rod 107, whereas lengthwise movement of said rod has the effect of locking disk 103.

Rotation of disk 103 in clockwise direction, through an angular distance of 180°, as required for switching in the pump motor, is normally prevented by the cooperation of a rocking lever 131 with a spring biased pawl 133 mounted on the disk. Said pawl is constructed substantially as shown in Fig. 3 and need not, therefore, be further described.

Rod 107 is provided with an enlarged portion 109, the inner shoulder 110 of which is chamfered. An antifriction roller 111, which is mounted to one arm 112 of a lever pivoted as at 113, is held in engagement with rod 107. The other, bifurcated arm of said lever is designated by 114 and is provided with pins which extend into an annular groove in a hub portion of a disk 115, which is slidable on, but locked against rotation relative to, the shaft 116 of pointer 106. A coiled spring 117, which encircles shaft 116 and bears against a shoulder thereof, urges disk 115 into engagement with a coaxial disk 118 adapted to be driven by the liquid meter (not shown). Moreover, spring 117 holds roller 111 in engagement with shaft 107.

Keyed to shaft 116 is a mitre wheel 119 in mesh with a second mitre wheel 120. The latter has a diameter twice that of wheel 119 and is keyed to a shaft 121 projecting into an axial bore of rod 107. Shaft 121 has a cross pin 122 adapted to be received by the bifurcated inner end of rod 107.

If rod 107 is pushed inward, against the tension of spring 107a, antifriction roller 111 will ride up shoulder 110, thereby causing lever 112, 114 to swing about its pivot 113 against the thrust of spring 117. Owing to this swinging movement, disk 115 disengages disk 118, whereby the operative engagement of shaft 116, of pointer 106, with the liquid meter is released. On further inward movement of rod 107, the bifurcated inner end thereof engages pin 122, so that shaft 121 is compelled to follow any rotary movement that may be imparted to rod 107. If knob 102 is now turned through 360°, pointers 105, 106 are thereby reset to zero by means well known and symbolized by the mitre wheels 119, 120.

In their zero positions, both pointers are locked, the one (106) through a disk 123 having a notch 124 and secured to shaft 116, the other (105) through a disk 125 having a notch 126 and secured to the extended hub 128, through which pointer 105 is mounted on shaft 116.

Disks 123 and 125 cooperate with dogs 129 and 130, respectively, secured to the rocking lever 131 hereinbefore referred to. Said lever is pivoted as at 132 and its right hand side arm is engaged by a spring 127, which tends to swing the lever in counterclockwise direction and to hold the dogs 129, 130 in engagement with the circumferences of disks 123 and 125, respectively. If the pointers 105 and 106 reach their zero positions, dogs 129, 130 enter into the notches 124 and 126, respectively, thereby allowing lever 131 to swing through a small angular distance in counterclockwise direction under the pull of spring 127. Owing to this swinging movement, the left hand side end of lever 131 is moved out of the path of pawl 133, whereby disk 103 would have freedom of rotation in clockwise direction, if rod 107 had not been pushed inward to the right so that its unbroken portion lies in notch 104 so as to lock said disk.

If knob 102 is now released, rod 107 returns to its initial position under the pull of spring 107a, so that its bifurcated inner end is retracted from pin 122 so as to release the operative association of knob 102 with the counter. Only thereafter, antifriction roller 111 moves down the chamfered shoulder 110 under the thrust of spring 117, so that disk 115 is urged into engagement with disk 118, thereby restoring the operative association between the meter and the pointers 105, 106 in their zero positions.

After rod 107 has returned to its initial position, its groove 108 again lies in the plane of disk 103, so that the latter is no longer restrained from rotation by means of the crank handle 101. Disk 103 is provided with a cam face 134, which, during such rotation, moves the left hand side end of rocking lever 131 upward against the pull of spring 127, thus retracting dogs 129, 130 from the notches 124 and 126, respectively, and releasing pointers 105, 106. Further rotation of the crank handle 101 in clockwise direction causes the pump motor to be switched in.

It is pertinent here to remark that disk 103 is associated with means such as described with reference to Fig. 5, preventing it, during clockwise movement, from being turned in the reverse direction until the disk has performed its full excursion. If, thereafter, the disk is turned in counterclockwise direction with a view to the switching out of the pump motor, spring pawl 133 will, at the end of said return movement, slide past the left hand side end of rocking lever 131 and be depressed thereby. Immediately thereafter, however, pawl 133 resumes its normal position wherein it locks disk 103 against rotation in clockwise direction.

What I claim is:

1. In motor driven fluid pumping apparatus having a meter for measuring the fluid pumped and a counter coupled to the meter adapted to be uncoupled and returned to zero, a shaft, a first cam driven by the shaft, a second cam rotated by the shaft, a rod for uncoupling the counter from the meter and returning the counter to zero, means carried by the rod engaging the first cam for moving said rod to a position to couple the counter to the meter upon initial rotation of the shaft, a bar for starting and stopping the motor, means carried by the bar engaging the second cam for moving said bar to start the motor upon further rotation of the shaft, stops limiting the rotation of said shaft, and means preventing reverse rotation of said shaft intermediate of said stops.

2. In motor driven fluid pumping apparatus having a meter for measuring the fluid pumped and a counter coupled to the meter adapted to be uncoupled and returned to zero, a shaft, a cam driven by the shaft having a spiral groove therein merging into a groove concentric with the axis of the shaft, a rod, means carried by the rod extending into said groove whereby the counter is uncoupled from the meter and returned to zero when said means is arranged in the spiral portion of said groove, a crank for rotating said shaft, a second cam driven by the shaft, a bar for starting and stopping the motor, means carried by the bar engaging the second cam for moving the bar to start the motor when the first mentioned means passes into the concentric portion of said groove, and means preventing reversed rotation of said shaft from positions intermediate of a substantially complete revolution thereof.

3. In motor driven fluid pumping apparatus having a meter for measuring the fluid pumped and a counter coupled to the meter adapted to be uncoupled and returned to zero, a shaft, a first cam driven by the shaft, a second cam rotated by the shaft, a rod for uncoupling the counter from the meter and returning the counter to zero in one end position thereof, means carried by the rod engaging the first cam for moving the rod to a position to couple the counter to the meter upon an initial angular rotation of the shaft, a bar for starting and stopping the motor, means carried by the bar engaging the second cam for moving said bar to a position to start the motor upon further rotation of the shaft, means limiting the rotation of said shaft to substantially one revolution, and ratchet means preventing reversed rotation of said shaft from a position intermediate one revolution thereof.

JOHAN LODER.